United States Patent
Munro

[11] Patent Number: 5,863,370
[45] Date of Patent: Jan. 26, 1999

[54] METHOD OF BONDING CLOTH COVER TO SUBSTRATE BASE

[75] Inventor: Charles F. Munro, Port Huron, Mich.

[73] Assignee: United Technologies Automotive, Inc., Dearborn, Mich.

[21] Appl. No.: 770,697

[22] Filed: Dec. 19, 1996

[51] Int. Cl.[6] ............................. B32B 29/02; B32B 31/20
[52] U.S. Cl. ............................. 156/214; 156/282; 100/38
[58] Field of Search ..................... 156/282, 581, 156/583.1, 583.4, 475, 212, 214, 219; 100/38, 325, 326

[56] References Cited

U.S. PATENT DOCUMENTS

| | | | |
|---|---|---|---|
| 2,590,221 | 3/1952 | Stevens | 156/282 |
| 3,396,070 | 8/1968 | Gambill et al. | 156/219 |
| 4,145,239 | 3/1979 | Fujii . | |
| 4,174,991 | 11/1979 | Reuben | 156/282 |
| 4,249,983 | 2/1981 | Fujii | 156/475 |
| 5,250,146 | 10/1993 | Horvath | 156/581 |

FOREIGN PATENT DOCUMENTS

| | | |
|---|---|---|
| 660182 | 8/1965 | Belgium . |
| 0569846 | 11/1993 | European Pat. Off. . |
| 1582539 | 1/1981 | United Kingdom . |
| 2273906 | 7/1994 | United Kingdom . |
| 8801935 | 3/1988 | WIPO . |

*Primary Examiner*—Jeff H. Aftergut
*Attorney, Agent, or Firm*—Howard & Howard

[57] ABSTRACT

A method for forming a headliner including a fluted paper central substrate includes forming the fluted paper substrate in a first forming tool. The formed substrate is then moved to a second bonding tool. A cover layer and an adhesive layer are actuated in the bonding tool to secure the cover layer to the substrate. The bonding tool preferably consists of a heated upper portion adjacent the cover layer and the adhesive, and a cooled lower portion which receives the base material. The use of the cooled bottom portion maintains the dimensional accuracy of the base layer during the bonding process. The heated upper layer ensures efficient and quick actuation of the adhesive to bond the cover layer to the substrate.

12 Claims, 1 Drawing Sheet

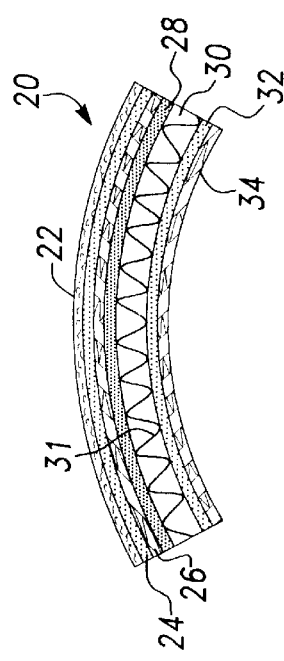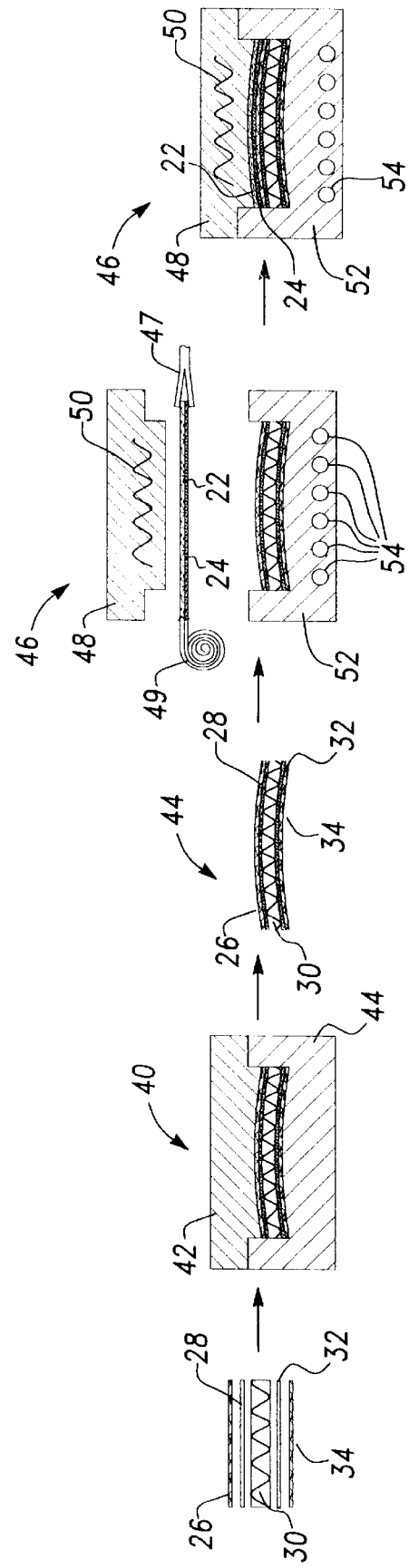

METHOD OF BONDING CLOTH COVER TO SUBSTRATE BASE

BACKGROUND OF THE INVENTION

This invention relates to a unique method of bonding a fabric cover to a substrate base for an interior trim panel such as a vehicle headliner.

In the prior art, headliners are often manufactured from a fabric cover layer which is bonded to an underlying base. The base provides shape and rigidity to the cover. In one very successful type of vehicle headliner, the base is provided by several paper layers. In particular, a fluted paper, which is similar to the corrugated paper utilized for cardboard, is used as a core. Kraft paper is laminated on both the top and bottom of the fluted paper. In essence, this results in a similar to standard cardboard.

In the prior art, the kraft paper layers have been adhered to the fluted paper layer by polyethylene film adhesive layers. Thus, it is known to provide a sandwich of outer kraft paper layers, and an inner fluted paper layer with intermediate polyethylene film adhesive layers. The several layers are then heated, and the kraft paper adheres to the central fluted layer.

Two standard methods are then utilized to adhere the cover to this substrate base. In one method, the tool which is utilized to heat the layers to form the substrate, is also utilized to heat and activate another polyethylene adhesive layer placed on the base substrate. An outer cover layer is placed outwardly of this adhesive layer. The adhesive layer is heated such that it then bonds the cover to the substrate. In this prior art method, the tool utilized to form the headliner into its desired shape and to secure all of the layers together, uses a forming tool having heated top and bottom halves. With this method, there has sometimes been difficulty maintaining the dimensional integrity of the substrate, particularly during the subsequent heating to adhere the cloth layer. This is believed due to the repeated heating of the substrate.

In a second method, a second tool is utilized to adhere the outer cover layer. The substrate base is formed in a forming tool, with a heated top and bottom half. The substrate base is then removed from the forming tool and placed into a bonding tool. The bonding tool receives the substrate base, a layer of polyethylene adhesive, and the outer cover. The bonding tool then closes on the several layers. The latent heat in the base layer alone is relied upon to actuate the polyethylene adhesive layer. While this method does provide improvements in the final dimensional integrity of the overall headliner, it requires undesirably large amounts of time to actuate the adhesive layer.

It is a goal of vehicle headliner assembly lines to manufacture as many headliners in as small a time period as is reasonably possible.

SUMMARY OF THE INVENTION

In the disclosed embodiment of this invention, a method of forming a vehicle headliner includes the steps of forming a substrate base in a forming tool. The substrate base is then removed and transferred to a bonding tool. The bonding tool receives the substrate base while it is still at an elevated temperature from the forming tool. The bonding tool receives the substrate base in a first half, and an adhesive layer, and the outer cover layer are then placed on the substrate base. The adhesive layer and the cover layer are spaced from the base toward a heated second half of the forming tool. The heated second half of the forming tool is heated, and the adhesive layer bonds the cover to the substrate. Since the substrate base remains in the unheated half of the bonding tool, the dimensional integrity of the substrate is maintained. On the other hand, since the adhesive layer for the cover is received in a heated half of the bonding tool, the overall bonding occurs rapidly when compared to the prior art.

In preferred embodiments of this invention, the unheated first half is cooled. In this way, the dimensional integrity of the base is maintained while the cover layer is bonded to the base.

In preferred embodiments of this invention, the heated half of the bonding tool is heated to between 275° and 325° F. The lower half is maintained between 75° and 125° F. The headliner is maintained in this bonding tool for approximately 20–30 seconds. A pressure is applied to the covering material in the range of 12–20 psi.

These and other features of the present invention can be best understood from the following specification and drawings, of which the following is a brief description.

BRIEF DESCRIPTION OF THE DRAWINGS

FIG. 1 is a cross-sectional view through a vehicle headliner made according to the present invention.

FIG. 2 is a schematic view showing the several steps in the method of the present invention.

DETAILED DESCRIPTION OF THE PREFERRED EMBODIMENT

A improved headliner 20 made according to the method of the present invention is shown in FIG. 1. An outer decorative cover 22 is secured by an adhesive layer 24 to an outer kraft paper layer 26. Kraft paper layer 26 is secured by an adhesive layer 28 to a fluted paper layer 30 having a corrugated core 31. Fluted paper layer 30 is also secured by an adhesive layer 32 to an inner kraft paper layer 34. The particular materials utilized for this invention are as known in the art. The basic arrangement of the kraft paper layers 26 and 34 and the central fluted layer 30 are presently utilized in the headliner industry. One particular type of such paper is available from Eften, Inc. of Auburn Hills, Mich.

The present invention does not change the structure of the headliner, but rather improves the method of forming the several layers into a headliner.

The improved method is illustrated schematically in FIG. 2. As shown in FIG. 2, the initial step in forming headliner 20 is to assemble the kraft paper layers 26 and 34 with their associated adhesive layers 28 and 32 and the fluted paper layer 30. The adhesive layers 28 and 32 may be polyethylene adhesive film layers. As an example, a supplier may supply the layers assembled on top of each other in appropriate order, and stapled or otherwise secured together without the adhesive layers being actuated. The several layers 26, 28, 30; 32 and 34 are then placed in a forming tool 40. Forming tool 40 is provided with upper and lower halves 42 and 44 which are heated. The layers are then shaped to an appropriate curvature for the desired final headliner configuration, and at that time the adhesive layers 28 and 32 melt to bond layers 26 and 34 to layer 30. The substrate base 44 is then removed from the forming tool 40. The substrate base 44 consists of the outer kraft paper layers 26 and 34 which are secured to the central fluted layer 30. It should be understood that the width of the layers, and in particular the adhesive layers, are exaggerated to better illustrate the fact of the layers.

The forming tool may be as known in the art. Typically, the forming tool is heated to 275° and 325° F. on both the top and bottom halves. The substrate is particularly heated for 20–30 seconds.

As further shown in FIG. 2, the substrate base 44 is then put into a bonding tool 46. Preferably, the substrate base is transported immediately from the forming tool 40 such that it is still warm when placed into the bonding tool 46. Manual or other robotic transportation methods may be utilized. The transportation of the substrate base from the forming tool to the bonding tool forms no portion of this invention.

As shown schematically, the cover layer 22 and its adhesive 24 may be brought over the substrate base 44 in any of several ways. In one preferred way, a robotic manipulator 47, shown schematically grabs a spool 49 of a combined cover and adhesive layer material and pulls that material over the bonding tool. The bonding tool upper half 48 is then brought downwardly toward the lower half. A cutting portion on the upper half cuts the cover and adhesive material to size.

In the bonding tool 46, an upper half 48 is provided with heating elements 50. The heating elements 50 may be known electrical heating elements. The substrate base 44 is placed within a bottom half 52 of the bonding tool 46. Bottom half 52 is provided with cooling structure such as water channels 54. Cooling water is circulated within channels 54 in bottom half 52. Although the heated half is shown as top half 48 and the cooled half is shown as the bottom half 52, that arrangement could be reversed. Preferably, the cooled half is associated with the previously heated substrate base 44 while the heated half is associated with the adhesive 24 which is to adhere the cover 22. The bonding tool 46 is then closed, the top half 48 is heated and the bottom half 52 is cooled. Preferably, the top half is heated to a range of between 250° to 325° F. The lower half is maintained at between 70° and 125° F. The dwell time is 15–30 seconds.

Preferred embodiments of this invention have been disclosed, however, a worker of ordinary skill in the art would recognize that certain modifications would come within the scope of this invention. For that reason, the following claims should be studied to determine the true scope and content of this invention.

I claim:

1. A method of forming a trim panel comprising the steps of:
   (a) placing a plurality of layers in a first tool, applying heat to said layers from said first tool to form a base;
   (b) moving said substrate base to a second tool, said second tool having first and second halves, placing said base in said first half;
   (c) placing a first adhesive layer on said base, and a cover layer on said first adhesive layer, and placing said second half of said second tool adjacent said cover layer, applying heat from said second half of said tool to raise said second half of said tool to a relatively high first temperature, and to actuate said first adhesive layer and bond said cover to said base;
   (d) maintaining said first half of said tool at a second temperature which is less than said first temperature; and
   (e) said first half of said tool being cooled. and said second temperature being in a range of 70° to 125° Fahrenheit.

2. A method as recited in claim 1, wherein said first half of said tool is a bottom half and said second half of said tool is a top half.

3. A method as recited in claim 1, wherein said relatively high first temperature is in a range of between 275° to 325° F.

4. A method of forming a trim panel comprising the steps of:
   (a) placing a plurality of layers in a first tool, applying heat to said layers from said first tool to form a base;
   (b) moving said substrate base to a second tool, said second tool having first and second halves, placing said base in said first half;
   (c) placing a first adhesive layer on said base, and a cover layer on said first adhesive layer, and placing said second half of said second tool adjacent said cover layer, applying heat from said second half of said tool to raise said second half of said tool to a relatively high first temperature, and to actuate said first adhesive layer and bond said cover to said base;
   (d) maintaining said first half of said tool at a second temperature which is less than said first temperature; and
   (e) said first half of said tool being cooled, and said second temperature being in a range of 70° to 125° Fahrenheit; and
   (f) said base being provided with a central fluted paper layer, and outer kraft paper layers on both sides of said fluted paper layer, said outer kraft paper layers being secured to said fluted paper layer by second and third adhesive layers, said second and third adhesive layers being actuated by said first tool to bond said outer kraft paper layers to said central fluted paper layer.

5. A method as recited in claim 4, wherein said first adhesive layer is a film.

6. A method as recited in claim 5, wherein said first adhesive layer is a polyethylene film adhesive.

7. A method as recited in claim 4, wherein said first temperature is in a range of between 275° to 325° F.

8. A method as recited in claim 7, wherein said second temperature is in a range of between 70° and 125° F.

9. A method of forming a trim panel comprising the steps of:
   (a) placing a plurality of layers in a first tool, applying heat to said layers from said first tool to form a base;
   (b) moving said base to a second tool, said second tool having first and second halves, placing said base in said second half;
   (c) placing a first adhesive film layer on said base, and a cover layer on said adhesive film, and placing said second half of said second tool adjacent said cover layer, applying heat from said second half of said tool to raise said second half of said tool to a relatively high first temperature in a range between 275° and 325° F., and to actuate said adhesive and bond said cover to said base; and
   (d) cooling said first half of said tool, during step (c) to maintain a second temperature in a range between 70° to 125° F.

10. A method as recited in claim 9, wherein said base includes a central fluted paper layer, and outer kraft paper layer on both sides of said fluted paper layer, said outer kraft paper layers being secured to said fluted paper layer by second and third adhesive film layers, said second and third adhesive film layers being actuated by said first tool to bond said outer kraft paper layers to said central fluted paper layer in step (a).

11. A method as recited in claim 10, wherein said adhesive film layers are polyethylene adhesive layers.

12. A method of forming a trim panel comprising the steps of:
   (a) providing a pair of outer paper layers, said outer paper layers being positioned outwardly of inner adhesive film layers, said adhesive film layers being unmelted, and a central fluted paper layer being positioned between said adhesive layers to form a substrate;
   (b) placing said substrate in a first tool, and applying heat from said first tool to said layers to bond said kraft paper layers to said fluted paper layer;
   (c) moving said substrate to a second tool, said second tool having first and second halves, said substrate being placed in said second half;
   (d) placing an adhesive layer on said substrate, and a cover layer on said adhesive layer, and a second half of said tool being positioned adjacent said cover layer and said adhesive, said second half of said tool being heated, and said first half of said tool being cooled such that said adhesive layer bonds said cover layer to said base, while maintaining the dimensional integrity of said substrate.

* * * * *

UNITED STATES PATENT AND TRADEMARK OFFICE
CERTIFICATE OF CORRECTION

PATENT NO. : 5,863,370
DATED : January 26, 1999
INVENTOR(S) : Charles E. Munro

It is certified that error appears in the above-identified patent and that said Letters Patent is hereby corrected as shown below:

On the title page, Item [75], the inventor's middle initial should be E.
It is listed as F. Please make the necessary corrections.

Signed and Sealed this

Third Day of August, 1999

Attest:

Q. TODD DICKINSON

Attesting Officer

Acting Commissioner of Patents and Trademarks